Patented June 1, 1943

2,320,718

UNITED STATES PATENT OFFICE 2,320,718

RUBBER COMPOUND

Frank W. Corkery, Crafton, and Samuel G. Burroughs, Pittsburgh, Pa., assignors to Pennsylvania Industrial Chemical Corporation, a corporation of Pennsylvania No Drawing. Application April 13, 1940, Serial No. 329,579

5 Claims. (Cl. 260—3)

This invention relates to the compounding of rubber.

Our invention resides in the use and incorporation in a rubber compound of a softening and dispersing agent of novel sort.

Rubber compounds are used for a variety of purposes, and their composition is in detail varied in accommodation to such uses. The two principal fields in which rubber compounds are used are in vehicle tires and tubes as one such chief field, and in what are known as mechanical rubber goods as the other chief field. Amongst other articles, mechanical rubber goods include mats, the soles and heels of shoes, storage battery cases, and hot water bottles. A third field of use for rubber compounds which, however, consumes them in lesser volume, is the electrical industry, in which rubber is employed both for its protective properties and for its properties of electrical insulation.

A typical rubber compound may be considered to consist primarily of seven ingredients, although subtraction from and addition to those ingredients is frequently made for particular utility in the broad fields in which rubber compounds are used. The primary, or basic, ingredients of rubber compounds may be taken as: (1) rubber; (2) a softener for the rubber and dispersant for filling material in the rubber—usually a resin; (3) a smoothing agent for the rubber—usually stearic acid; (4) a filler for the rubber, commonly zinc oxide, carbon black, whiting or the like; (5) a vulcanizing or curing agent—sulphur; (6) an antioxidant to improve the aging properties of the rubber—such as phenol alphanaphthylamine; (7) an accelerator for the cure functioning either to lessen the time or temperature of the curing—such as mercapto-benzo-thiozole. While for most uses of the more general sort, all of such ingredients are included in the rubber compound, the proportions of the ingredients are varied. For instance, in the preparation of rubber for the manufacture of the inner tubes of vehicle tires, and in analogous uses, the composition consists largely of rubber, and includes only enough of the other ingredients to effect the desired working and curing in making the compound, and to provide in desired order such other qualities as toughness, abrasion-resistance, and resistance to aging. In vehicle tire casings, and in mechanical rubber goods, however, the ingredients, other than rubber itself, usually predominate. For example, in rubber heels, the filling ingredient or ingredients and the softener are preponderantly included, and the content of rubber itself is only such as is adequate to provide for a permanent set in the article by vulcanization.

In accordance with standard and predominant procedure in making rubber compounds, the rubber in the form of smoked sheets, pale crepe rubber, or in otherwise partially prepared condition, is first broken down on rolls to soften the rubber and to prepare it for mixing with the filler material or materials, and with the other ingredients selected for the compound. The rubber is then mixed with other ingredients of the compound in apparatus organized for that purpose, typically in mixing rolls. After mixing, the compound optionally may be calendered to improve its homogeneity, smoothness, and in measure to preform the rubber in preparation for molding and vulcanization. Possibly, in mixing the compound, but more commonly and preferably in the breakdown rolls, a softening agent is added to the rubber in preparation for the addition of the other ingredients. It has been common practice to use as such softening agent either coal-tar residues, an inexpensive coumarone-indene resin, or pine tar. Of these softening agents, pine tar, or coumarone-indene resin, are commonly used.

We have discovered the applicability of a softening agent for rubber which possesses all the advantages of coumarone-indene resin and coal-tar residues for that purpose and which is additionally in some respects superior to the coumarone-indene resin and coal-tar residues. Such novel softening agent is, in its most general aspect, the polymers of terpenes and desirably the higher terpene polymers. By the "higher" terpene polymers, we intend to designate all polymers of terpene higher (i. e., containing more terpene units) than the dimers.

Terpene resins produced by catalytic polymerization in terpene substances, such as gum spirits and wood turpentine have been so difficult of production in their higher polymeric forms that there has not been in the past commercially available a terpene resin even of moderately high melting point which has possessed properties rendering its general use advantageous. There is currently available as a new material of commerce a terpene resin which, as produced in accordance with the method disclosed and claimed by Samuel G. Burroughs in application Serial No. 288,390, filed August 4, 1939, is composed either wholly or preponderantly of polymers of beta-pinene. Whether or no such resin contains polymers of the other polymerizable terpenes, such as alpha-pinene and terpinolene, its melting point and its properties are so dependent upon its preponderant formation of beta-pinene polymers that we may justifiably term it beta-pinene resin. Currently this "beta-pinene" resin may be considered commercially to be high-melting terpene resin. In accordance with the extent to which it consists of beta-pinene polymers, and in accordance with the procedure employed in recovering the resin after formation of the polymers, the beta-pinene resin has a melting point of from about 80° C. to 150° C. (ball and ring) and higher.

This polymerization product, irrespective of its melting point, or average molecular weight, has a color intensity lower than a number 1 color on the paracoumarone resin color scale. Its acid number and saponification number is approximately zero. It is cyclic in its chemical arrangement and has a moderate iodine value varying inversely with the melting point of the resin. Due to its cyclic chemical structure, it does not acquire color on ageing.

We have discovered that the polymers of cyclic terpene units are highly compatible with rubber in an order which makes useful the inclusion of terpene resin of molecular weight, and melting point, higher than that of coumarone-indene resin when worked into the rubber to soften it. This is of advantage in that it contributes to the body of the rubber compound in which the resin is included, and more importantly because of the decreased tendency toward oxidation possessed by the higher molecular weight resin. For this reason we have discovered that there is particular advantage from including in the rubber compound terpene resin (typically beta-pinene resin) within the approximate melting range of 80° C. (ball and ring) to 150° C. (ball and ring) and upwards. Because of its chemical constitution, terpene resin tends to exert a greater solubilizing, or softening, effect on the rubber than does coumarone-indene resin. The terpene resin is resistant to the same chemicals as rubber, such for instance as acids and alkalis. Having good solubility in the same solvents as rubber, its inclusion in a rubber compound does not restrict the use of the compound in any association in which it is desirable that a solution of it be made. It thus facilitates rubber reclamation in that it assists in solvent preparation of the rubber from mechanically or chemically included impurities. It also permits use of the resin for its dispersant and permanent softening functions in processes, such as the Parkes process, in which at least the compounding of the rubber is effected in solution.

While we have experienced specific advantage from the use of the high-melting terpene resin, as currently represented by beta-pinene resin, it is a fact that any of the "higher" terpene polymers present a tendency to oxidation much less than is presented by the terpene dimers. We do not, therefore, wish to leave out of consideration the use of terpene resin which is of relatively low melting point, but which consists preponderantly of terpene polymers higher than the terpene dimer. Currently such terpene resin may be made by effecting polymerization in a terpene starting material which is not preponderantly composed of beta-pinene, or by adding a softer terpene resin or terpene dimers to a relatively high melting terpene resin.

An important advantage of terpene resin, and of this general type the beta-pinene resin is taken as representative, resides in its color stability. That is, the beta-pinene resin is not only initially of light color, but it does not tend to develop color with age. In rubber compounds there is a phenomenon known as "travelling," which is the tendency of the thermoplastic softening ingredient of the compound to come to the surface of the rubber rather than to remain uniformly distributed throughout its body. Certain previously used rubber softeners, and this is strikingly true of coumarone-indene resin, tend definitely to develop a relatively dark coloration upon coming to the surface of the rubber articles. In mechanical goods which are white, gray, or made in light tones, and in white side-walls of vehicle tires, the discoloration thus produced detracts from the good appearance of the articles. To some extent, attributable to its chemical organization, the terpene resin tends to travel less than do other softening agents, and even if it does travel to the surface of the rubber, does not darken to give a spotted appearance to light colored rubber articles.

We utilize terpene resin in rubber compounding, as above indicated, by mixing it with rubber which has been purified for compounding, and desirably work it into the rubber in the breakdown rolls. The quantity of the resin worked in with the rubber may vary greatly in accordance with the desired properties of the various compounds in which it may be included. Thus, in tire stock, the terpene resin, and by this we mean typically a relatively high melting terpene resin, such as a beta-pinene resin having a melting point of about 115° C. (ball and ring), may be included in a quantity equal to from about 2% to 10% the weight of the rubber in the compound. Its average inclusion being about 6%. In mechanical goods, the resin may suitably be included in the compound in much greater proportion, such as a proportion of from 25% the weight of the rubber in the compound, upwards. It desirably is included in a proportion of about 40% to 50% in hard rubber storage battery casings. In rubber used as insulation for electrical conductors, the resin may be present in the compound in a quantity amounting to as much as 50%, or more, the weight of the rubber.

It may be stated generally that in all the standard formulae for rubber compounds, proposed for various uses, the terpene resin may be included in a proportion at least as great as that in which either coumarone-indene resin or pine tar is included, and without substantial variation in the included proportions of antioxidant and other ingredients of the compound. In its high melting exemplifications, the terpene resin has an iodine value so low that it does not seriously detract from the effectiveness of the sulphur content of the compound in vulcanization. It is desirable, however, to include in the compound a fractional percentage of sulphur in excess of the usual in order to compensate for any sulphur which may react with the terpene resin.

The following are exemplary formulae for tire stock and for mechanical goods:

*Formula A—Tire stock*

| | Parts |
|---|---|
| Smoked sheets | 100 |
| Beta-pinene resin (M. P. 105° C.) | 6 |
| Stearic acid | 4 |
| Carbon black | 30 |
| Sulphur | 4 |
| Phenyl alpha-naphthylamine | 0.5 |
| Mercapto-benzo-thiazole | 0.25 |

*Formula B—Mechanical goods*

| | Parts |
|---|---|
| Smoked sheets | 100 |
| Beta-pinene resin (M. P. 70° C.) | 75 |
| Stearic acid | 10 |
| Calcium carbonate | 50 |
| Silica | 50 |
| Sulphur | 5 |
| Mercapto-benzo-thiazole | 0.3 |

Under the softening effect on the rubber resultant from the incorporation of the terpene resin, the typical filler material, or materials, and the typical conditioning agent, or agents, for the rubber may, with increased facility be incorporated by mixing. As above noted, it is desirable that the resin be incorporated in the breakdown rolls, so that its full effect in dispersing and compounding may be obtained. It may, however, if so desired, be incorporated while mixing together all the ingredients of the compound. In either case there are in the compound persistent advantages derived from the incorporation of the terpene resin.

By typical filler materials for the rubber and typical conditioning agents therefor, we mean filler materials, such as carbon black, zinc oxide, and the various suitable clays, which are typically used in rubber compounds. By typical conditioning agents, we mean sulphur, or its equivalents; stearic acid, or its equivalents; antioxidant, such as phenyl alpha-naphthylamine, or its equivalents; and an accelerator, such as mercapto-benzo-thiazole, or its equivalents.

The processes in which the rubber is compounded, with utilization of terpene resin as a softener and dispersant, may typically be of any of the better known processes by which rubber has been compounded and vulcanized with inclusion of a material of resinous sort as a softener for the rubber.

Whereas various rubber softening substances have with advantage been used in varying proportions in rubber compounds purposed for different uses, we have discovered that terpene resin, and typically high-melting beta-pinene resin representative of terpene resin of the higher melting grades, is peculiarly adapted to this use, both in its high compatibility with the rubber and in its solubility in rubber solvents, as well as in the advantages derivable from its non-yellowing property. We have discovered that because of its non-yellowing property, and its high solubility and wetting power, the terpene resin makes a better vehicle for the pigmentation of rubber than do any of the rubber softeners previously in common use.

Also, we have discovered that because the high melting examples of terpene resin have such compatibility with the rubber, and may be included in such high proportion in rubbing compounds, it is possible to obtain an enduring tackiness of high order by use of the high melting terpene resin in tire manufacture, readily to bond the plies of the tires. Also because of the fact that high melting examples of terpene resin have high compatibility with the rubber, such high melting resin, when included in large proportion, tends to give a smooth and finished appearance to the molded rubber articles, and tends to facilitate release of such articles from the mold.

As a general statement of our invention, it resides in the discovery that, while using formulae and following procedures known to the art, we may use terpene resin of the sort disclosed, and particularly a high-melting terpene resin, such as beta-pinene resin, as a softening agent with resultant marked and peculiarly advantageous effects.

Where melting point is given without qualification in the specification and claims, it is to be assumed that it is taken by the ball and ring method of softening point determination. Where parts, or proportions, are given, such parts or proportions are to be taken as by weight.

We claim as our invention:

1. A vulcanized rubber composition containing rubber, rubber filler, and pinene resin consisting preponderantly of beta-pinene polymers higher than the dimer and melting within the approximate range of 80° C. to 150° C.

2. A vulcanized rubber composition for use as tire stock and for like purposes containing rubber, rubber filler, and pinene resin consisting preponderantly of beta-pinene polymers higher than the dimer and melting within the approximate range of 80° C. to 150° C., the said pinene resin being included in a quantity equal to from about 2% to 10% the weight of the rubber in the composition.

3. A rubber composition for use as tire stock and for like purposes containing rubber, rubber filler, and pinene resin consisting preponderantly of beta-pinene polymers higher than the dimer and melting within the approximate range of 80° to 150° C., the said pinene resin being included in a quantity equal to about 6% the weight of the rubber in the composition.

4. A vulcanized rubber composition containing rubber, rubber filler, and pinene resin consisting preponderantly of beta-pinene polymers higher than the dimer and melting within the approximate range of 80° C. to 150° C., the said pinene resin being included in a quantity equal to from about 2% to about 50% the weight of the rubber in the composition appropriately to the desired properties thereof.

5. A vulcanized rubber composition for use as stock in mechanical goods and for like purposes containing rubber, rubber filler, and pinene resin consisting preponderantly of beta-pinene polymers higher than the dimer and melting within the approximate range of 80° C. to 150° C., the said pinene resin being included in a quantity of from about 25% to 50% the weight of rubber in the composition.

FRANK W. CORKERY.
SAMUEL G. BURROUGHS.